Patented July 4, 1950

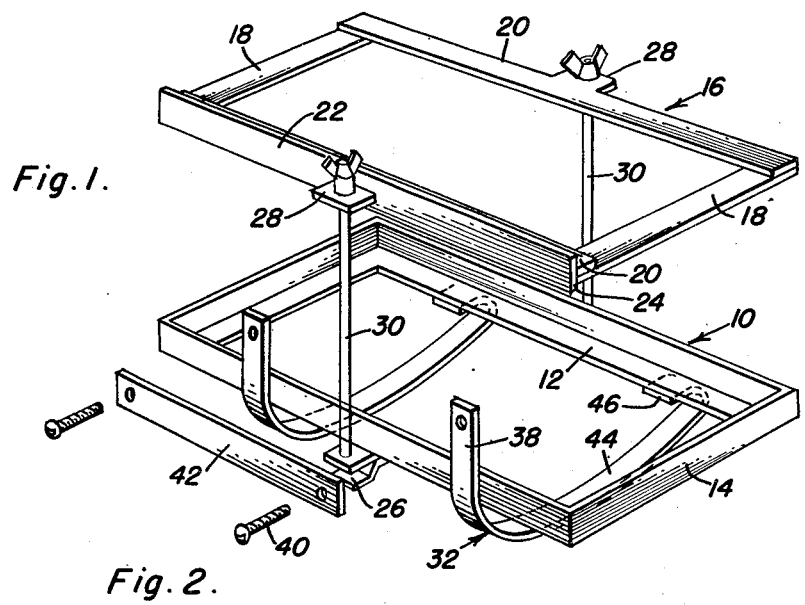
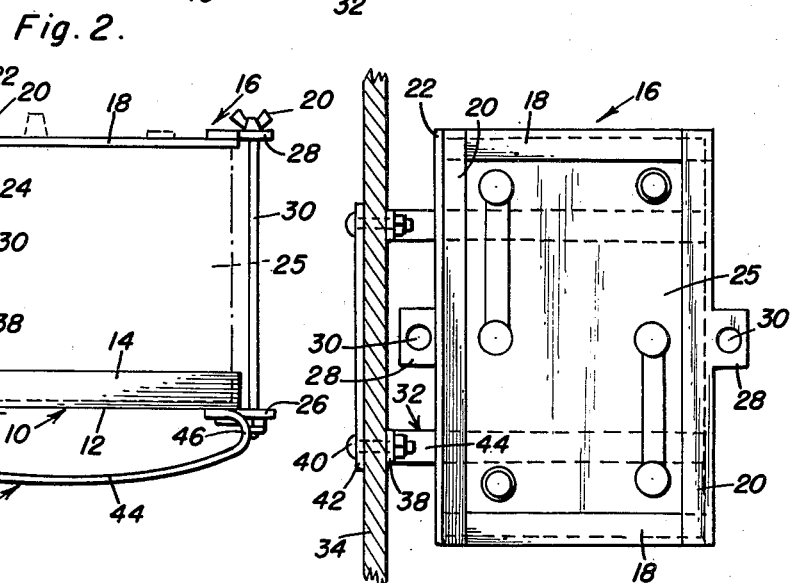
Inventor
Samuel Hatfield

2,514,056

UNITED STATES PATENT OFFICE 2,514,056

BATTERY SUPPORT

Samuel Hatfield, Lehigh, Iowa

Application October 20, 1947, Serial No. 780,918

1 Claim. (Cl. 180—68.5)

This invention relates to new and useful improvements in battery supports and the primary object of the present invention is to provide a battery support including novel and improved hanger means that are secured to the dash of a vehicle within the vehicle engine compartment to afford a spring support for the battery, so that during operation of the vehicle over rough terrain the usual occurring damage to the battery will be effectively eliminated.

Another important object of the present invention is to provide a battery support so designed as to afford a maximum open frame for engaging the battery so that the battery may be retained in a position within a vehicle engine compartment to remain in a relatively cool state due to the air currents in the vehicle engine compartment resulting from the engine fan.

A further object of the present invention is the provision of a battery support that is applicable for all types and sizes of conventional vehicle batteries and one that is quickly and readily applied to a vehicle dash within the engine compartment of the vehicle to be easily and conveniently serviced.

A still further aim of the present invention is to provide a battery support for vehicles that is simple and practical in construction, strong and reliable in use, neat and attractive in appearance, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which—

Figure 1 is a group perspective view of the battery support constructed in accordance with the present invention;

Figure 2 is a fragmentary longitudinal vertical sectional view of a vehicle dash and showing the present battery support applied herein in side elevation, and with dotted lines showing a battery positioned within the support; and Figure 3 is a fragmentary transverse horizontal sectional view of a vehicle dash showing the present battery support in top plan applied thereto, and with dotted lines showing a battery positioned within the support.

Referring now to the drawings in detail, wherein for the purpose of illustration, there is disclosed a preferred embodiment of the present invention, the numeral 10 represents the base of the present battery support generally comprising a substantially rectangular, open plate 12 having an upstanding, peripheral battery retaining flange 14.

The numeral 16 represents the upper portion of the present battery support generally, including strips of metal forming a pair of spaced parallel end members 18 and a forward connecting member 20 rigidly positioned between the forward terminals of the end members. Fixedly secured to the rear terminals of the end members 18, are the end portions of the horizontally disposed leg 20 of a T-strip 22. One leg 24 of this T-strip projects vertically downward beneath the lower faces of the end members 18 to provide a retaining flange that prevents rearward movement of a battery 25 that is disposed upon the plate 12 between the retaining flanges 14.

Fixedly secured to the longitudinal sides of the base 10, are pairs of outwardly extending lower ears 26 supporting therebetween suitable nuts, the ears 26 oppose upper ears 28 that are rigidly carried by the forward connecting member 18 and the strip 22. These opposed ears are connected by adjustable fasteners 30.

Conventional battery supports now in use are normally rigidly secured to the dash so that as the vehicle on which the same is applied engages a rough surface in the road the support and battery will be jarred considerably, resulting in damage to the battery and usually the support. It is, therefore, the purpose of this invention to provide means for supporting the battery in such a manner as to reduce the normal shock imparted to the support and battery carried thereby. To accomplish this end, there is provided a plurality of resilient hangers or L-shaped straps 32 that are disposed within the engine compartment of a vehicle, opposing the inner vertical face 34 of the vehicle dash 36. The vertical legs 38 of these hangers 32 bear against the vertical portion 34 of the dash 36 and are connected to fasteners 40 extending through the dash from a bearing or wear strip 42 that is positioned on the face of the dash within the vehicle interior.

The free forward arcuate legs 44 of the hangers 32 extend beneath the base 10 and the free ends of the legs 44 are arcuated to provided spacer loops 46 that are rigidly secured to the lower face of the base 10 in any suitable manner, whereby the supporting structure and battery will remain normally in a horizontal position as shown in Figure 2 of the drawings.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claim.

Having described the invention, what is claimed as new is:

A battery support comprising spaced upper and lower frames, means adjustably connecting said frames, and resilient means carried by a structural element and supporting said lower frame in a substantially horizontal position, said resilient means including a plurality of arcuate spring members disposed beneath and spaced relative to said lower frame, said spring members having terminal loops including free extremities fixed to said lower frame, upstanding extensions at the free ends of said spring members and adapted to be spaced from a battery supported between said upper and lower frames, and means removably securing said extensions to said structural element.

SAMUEL HATFIELD.

REFERENCES CITED

The following references are of record in the file of this patent:

UNITED STATES PATENTS

| Number | Name | Date |
| --- | --- | --- |
| 1,053,103 | Martus et al. | Feb. 11, 1913 |
| 1,283,107 | Denneen et al. | Oct. 29, 1918 |
| 2,104,457 | Galamb | Jan. 4, 1938 |
| 2,104,772 | Saunders | Jan. 11, 1938 |
| 2,360,056 | Heitshu | Oct. 10, 1944 |
| 2,402,141 | Holman et al. | June 18, 1946 |